(12) United States Patent
Lee et al.

(10) Patent No.: US 9,066,222 B2
(45) Date of Patent: Jun. 23, 2015

(54) MOBILE BILLING OPERATOR SERVER PROGRAMMED FOR USER ACQUISITION WITHIN A REPEAT PAYMENT COMPUTER SYSTEM

(71) Applicant: Boku, Inc., San Francisco, CA (US)

(72) Inventors: Adam Lee, Burlingame, CA (US); Jonathan P. Prideaux, Guildford (GB); Katherine Ann Corner, San Francisco, CA (US); Samantha Elena Nebrich, San Francisco, CA (US)

(73) Assignee: Boku, Inc., San Francisco, CA (US)

( * ) Notice: Subject to any disclaimer, the term of this patent is extended or adjusted under 35 U.S.C. 154(b) by 0 days.

(21) Appl. No.: 13/772,261

(22) Filed: Feb. 20, 2013

(65) Prior Publication Data

US 2014/0235202 A1    Aug. 21, 2014

(51) Int. Cl.
| | |
|---|---|
| *G06Q 20/22* | (2012.01) |
| *H04W 4/24* | (2009.01) |
| *H04M 15/00* | (2006.01) |
| *H04M 17/02* | (2006.01) |
| *H04M 17/00* | (2006.01) |
| *G06Q 30/06* | (2012.01) |

(52) U.S. Cl.
CPC ............... *H04W 4/24* (2013.01); *H04M 15/51* (2013.01); *H04M 15/68* (2013.01); *H04M 15/75* (2013.01); *H04M 15/751* (2013.01); *H04M 17/02* (2013.01); *H04M 17/10* (2013.01); *H04M 17/103* (2013.01); *H04M 17/106* (2013.01); *G06Q 30/06* (2013.01)

(58) Field of Classification Search
CPC ... G06Q 20/32; G06Q 20/16; G06Q 20/3255; G06Q 20/123; G06Q 20/40; G06Q 20/22
See application file for complete search history.

(56) References Cited

U.S. PATENT DOCUMENTS

| | | | |
|---|---|---|---|
| 7,080,035 B1 * | 7/2006 | Williams et al. ................ | 705/40 |
| 2010/0030651 A1 * | 2/2010 | Matotek et al. ................. | 705/17 |
| 2013/0085936 A1 * | 4/2013 | Law et al. ....................... | 705/40 |
| 2013/0297353 A1 * | 11/2013 | Strange et al. .................... | 705/4 |
| 2013/0317980 A1 * | 11/2013 | Davis et al. .................... | 705/39 |
| 2014/0007196 A1 | 1/2014 | Lin | |
| 2014/0052616 A1 | 2/2014 | Choi et al. | |

* cited by examiner

*Primary Examiner* — Jinsong Hu
*Assistant Examiner* — Tabla Glomah
(74) *Attorney, Agent, or Firm* — Stephen M. De Klerk

(57) ABSTRACT

A repeat payment computer system includes a merchant server and mobile billing operator server that are programmed for user acquisition through carrier billing and subsequent conversion to credit card billing. An advantage of the process is that the user does not have to enter credit card information for the default billing cycles to occur. The user only enters a phone number and password. Fewer barriers are provided for the user to become a regular repeat customer of the merchant server. The fees associated with mobile billing according to the default billing cycles have to be paid by the merchant server and may be too high in the long run. The merchant server can avoid the high fees associated with carrier billing by switching the user to billing according to the credit card information provided. The user is typically switched after the user has already become a regular customer.

8 Claims, 9 Drawing Sheets

MOBILE BILLING OPERATOR SERVER PROGRAMMED FOR USER ACQUISITION WITHIN A REPEAT PAYMENT COMPUTER SYSTEM

BACKGROUND OF THE INVENTION

1). Field of the Invention

This invention relates to a repeat payment computer system, including a merchant server and mobile billing operator server that are programmed for user acquisition through carrier billing and subsequent conversion to credit card billing.

2). Discussion of Related Art

Merchants often use merchant servers for purposes of selling goods, services and virtual goods such as game credits, movies, music, etc. online. Some products that are sold online may require repeat payments. A repeat payment may for example be for a repeated purchase at the user's selection or according to a schedule set by the user. A repeat payment may also be for a subscription such as a monthly subscription to virtual goods such as movies or music.

The user may use a browser on a user mobile phone to transmit a registration page request to the merchant server and the merchant server will then return a registration page to the user mobile phone and the user registration page is then displayed within the browser. The registration page usually includes, or is immediately followed, by a page requiring the user to enter credit card information. The credit card information typically includes the first name, last name, card number, security code and billing zip code of a credit card held by the user. The user then has to find a credit card and enter the information into the registration page.

This is a cumbersome process for many users, resulting in users that cancel the registration process before it is completed. A potential customer is then lost to the merchant. By requiring credit card information in a registration process, the registration process may fail for a number of reasons such as the use of an expired credit card, incorrect information entered by the user, etc.

SUMMARY OF THE INVENTION

The invention provides a computer-based method of processing repeat payments, including receiving, with a mobile billing operator sever, a phone number of a user mobile phone, registering, with the mobile billing operator server, the phone number for repeat, payments with a mobile billing scheduling assistant of the mobile billing operator server, executing, with the mobile billing scheduling assistant, at least one default payment cycle that includes causing a charge to be entered against the phone number in an account database of a carrier server, transmitting, with the mobile billing operator server, a text to the user mobile phone at the phone number with a switch-over option after the default billing cycle, the switch-over option including a link that is selectable by a user of the user mobile phone to open a page that allows the user to enter credit card information for purposes of executing at least one modified billing cycle instead of the default billing cycle wherein the modified billing cycle includes charging a credit card having the credit card details at a credit card institution server other than the carrier server.

The method may further include that the default billing cycle includes receiving a payment from the carrier server at the mobile billing operator server.

The method may further include that the phone number is received at the mobile billing operator server from a merchant server.

The method may further include that the default billing cycle further includes making a payment from the mobile billing operator server to the merchant server.

The method may further include that the payment made from the mobile billing operator server is in response to the payment made to the mobile billing operator server.

The method may further include that the link causes the user mobile phone to open a browser window, request a switch-over page from the merchant server, and receive the switch-over page from the merchant server.

The method may further include that if the user fails to select the link, the mobile billing scheduling assistant repeats the default payment schedule.

The method may further include receiving, at the mobile billing operator server, a cancel notification from the merchant server when the merchant server receives the credit card information and cancelling, with the mobile billing operator server, the default payment on the mobile billing scheduling assistant in response to the cancel notification.

The method may further include receiving, with the mobile billing operator server, a charge amount and a schedule from the merchant server and registering, with the mobile billing operator server, the charge amount and schedule with the mobile billing scheduling assistant, wherein the default payment is repeatedly executed according to the schedule and the charge includes an amount that is based on the charge amount.

The invention further provides a repeat payment computer system, including a processor, a computer-readable medium connected to the processor and a set of instructions on the computer-readable medium, the set of instructions being executable by the processor. The set of instructions includes a module receiving a phone number of a user mobile phone, a mobile billing scheduling assistant, the phone number being registered for repeat payments with the mobile billing scheduling assistant executing at least one default payment cycle that includes causing a charge to be entered against the phone number in an account database of a carrier server and an SMS gateway transmitting a text to the user mobile phone at the phone number with a switch-over option after the default billing cycle, the switch-over option including a link that is selectable by a user of the user mobile phone to open a page that allows the user to enter credit card information for purposes of executing at least one modified billing cycle instead of the default billing cycle wherein the modified billing cycle includes charging a credit card having the credit card details at a credit card institution server other than the carrier server.

The system may further include that the default billing cycle includes receiving a payment from the carrier server at the mobile billing operator server.

The system may further include that the module receiving the phone number is a server call module that receives the phone number from the merchant server.

The system may further include that the default billing cycle further includes making a payment from the mobile billing operator server to the merchant server.

The system may further include that the payment made from the mobile billing operator server is in response to the payment made to the mobile billing operator server.

The system may further include that the link causes the user mobile phone to open a browser window, request a switch-over page from the merchant server, and receive the switch-over page from the merchant server.

The system may further include that if the user fails to select the link, the mobile billing scheduling assistant repeats the default payment schedule.

The system may further include that the server call module receives a cancel notification from the merchant server when the merchant server receives the credit card information, and cancels the default payment on the mobile billing scheduling assistant in response to the cancel notification.

The invention also provides a computer-readable medium having stored thereon a set of instructions that, when executed by a processor of a mobile billing operator server, carries out a method including receiving, with the mobile billing operator sever, a phone number of a user mobile phone, registering, with the mobile billing operator server, the phone number for repeat payments with a mobile billing scheduling assistant of the mobile billing operator server, executing, with the mobile billing scheduling assistant, at least one default payment cycle that includes causing a charge to be entered against the phone number in an account database of a carrier server, transmitting, with the mobile billing operator server, a text to the user mobile phone at the phone number with a switch-over option after the default billing cycle, the switch-over option including a link that is selectable by a user of the user mobile phone to open a page that allows the user to enter credit card information for purposes of executing at least one modified billing cycle instead of the default billing cycle wherein the modified billing cycle includes charging a credit card having the credit card details at a credit card institution server other than the carrier server.

BRIEF DESCRIPTION OF THE DRAWINGS

The invention is further described by way of example with reference to the accompanying drawings, wherein.

DETAILED DESCRIPTION OF THE INVENTION

Figure 1:
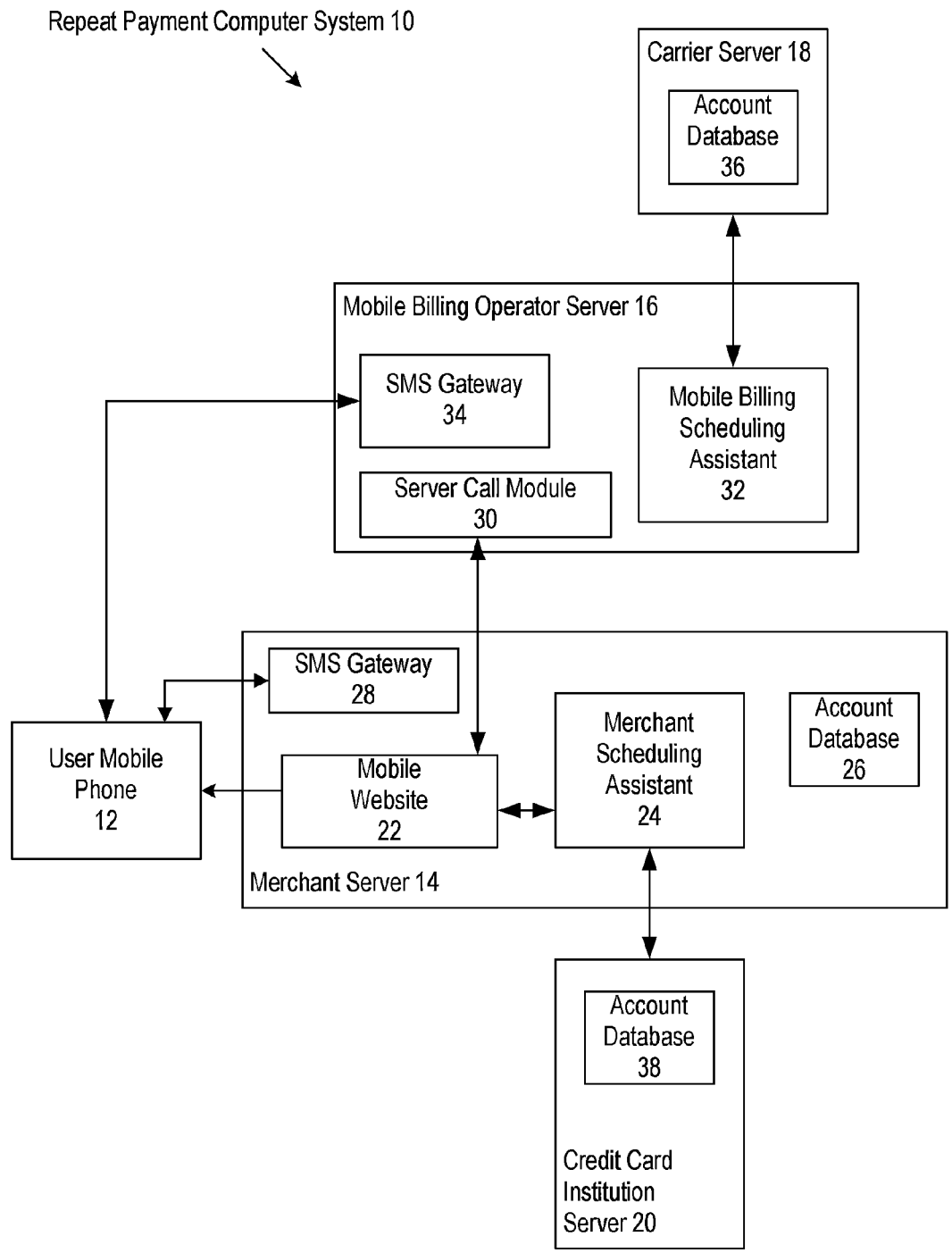
FIG. 1 is a block diagram of a repeat payment computer system according to an embodiment of the invention.

FIG. 1 of the accompanying drawings illustrates a repeat payment computer system 10, according to an embodiment of the invention, including a user mobile phone 12, a merchant server 14, a mobile billing operator server 16, a carrier server 18, and a credit card institution server 20.

The user mobile phone 12 includes a browser application and a text messaging application. The browser application transmits page requests to a mobile website and receives a page from the mobile website. The browser application then displays the page within a display of the user mobile phone 12. The text messaging application can send and received Short Message Service (SMS) text message or "texts" via an SMS network.

The merchant server 14 includes a mobile website 22, a merchant scheduling assistant 24, an account database 26 and an SMS gateway 28.

The user mobile phone 12 can connect to the mobile website 22 over a data communications network or over the Internet including a WiFi network. In this manner, the mobile website 22 can receive page requests from the user mobile phone 12 and transmit pages back to the user mobile phone 12 in response to the page requests.

The SMS gateway 28 is connected to the user mobile phone 12 over an SMS network. The SMS gateway 28 can transmit a text to the user mobile phone 12.

The merchant scheduling system 24 is connected to the mobile website 22. The mobile website 22 is capable of registering credit card information with the merchant scheduling assistant 24.

The account database 26 holds a number of accounts corresponding to a number of user mobile phones such as the user mobile phone 12. Each account is uniquely identified by a unique phone number. Each account also has a respective password and a respective personal identification number (PIN) associated therewith. Some accounts may also have credit card information associated therewith.

The mobile billing operator server 16 includes a server call module 30, a mobile billing scheduling assistant 32, and an SMS gateway 34.

The server call module 30 is connected over the Internet to the mobile website 22. The mobile website 22 transmits billing data to the server call module 30. The server call module 30 then registers the billing information with the mobile billing scheduling assistant 32. The billing information typically includes at least a phone number, but may also include a charge amount and a schedule according to which the charge amount has to be billed.

The SMS gateway 34 is connected over an SMS network to the user mobile phone 12. The SMS gateway 34 is capable of transmitting a text to the user mobile phone 12 for purposes of viewing by the text message application on the user mobile phone 12.

The carrier server 18 is a server of a telecommunications carrier. The carrier server 18 includes an account database 36. The account database 36 includes a number of accounts that are identified by phone numbers.

The mobile billing operator server 16 selects the carrier server 18 based on the phone number of the user mobile phone 12. One of the accounts within the account database 36 is identified by the phone number of the user mobile phone 12.

The carrier server 18 is a server of a network to which the user mobile phone 12 belongs. If a user of the user mobile phone 12 makes a call or transmits a text message from the user mobile phone 12, the call or the text message goes through the network of the carrier server 18 and is billed to the phone number of the user mobile phone 12 in the account database 36.

The carrier server 18 is also connected to the mobile billing scheduling assistant 32. The mobile billing scheduling assistant 32 periodically instructs the carrier server 18 to enter a charge amount against the phone number of the user mobile phone 12 in the account database 36.

The credit card institution server 20 includes an account database 38. The credit card institution server 20 is connected to the merchant scheduling assistant 24. The merchant scheduling assistant 24 can transmit credit card details and a charge amount to the credit card institution server 20. The credit card details include a credit card number that can be identified within the account database 38. The credit card institution server 20 then charges the respective credit card number within the account database 38 with the charge amount.

Figure 2:
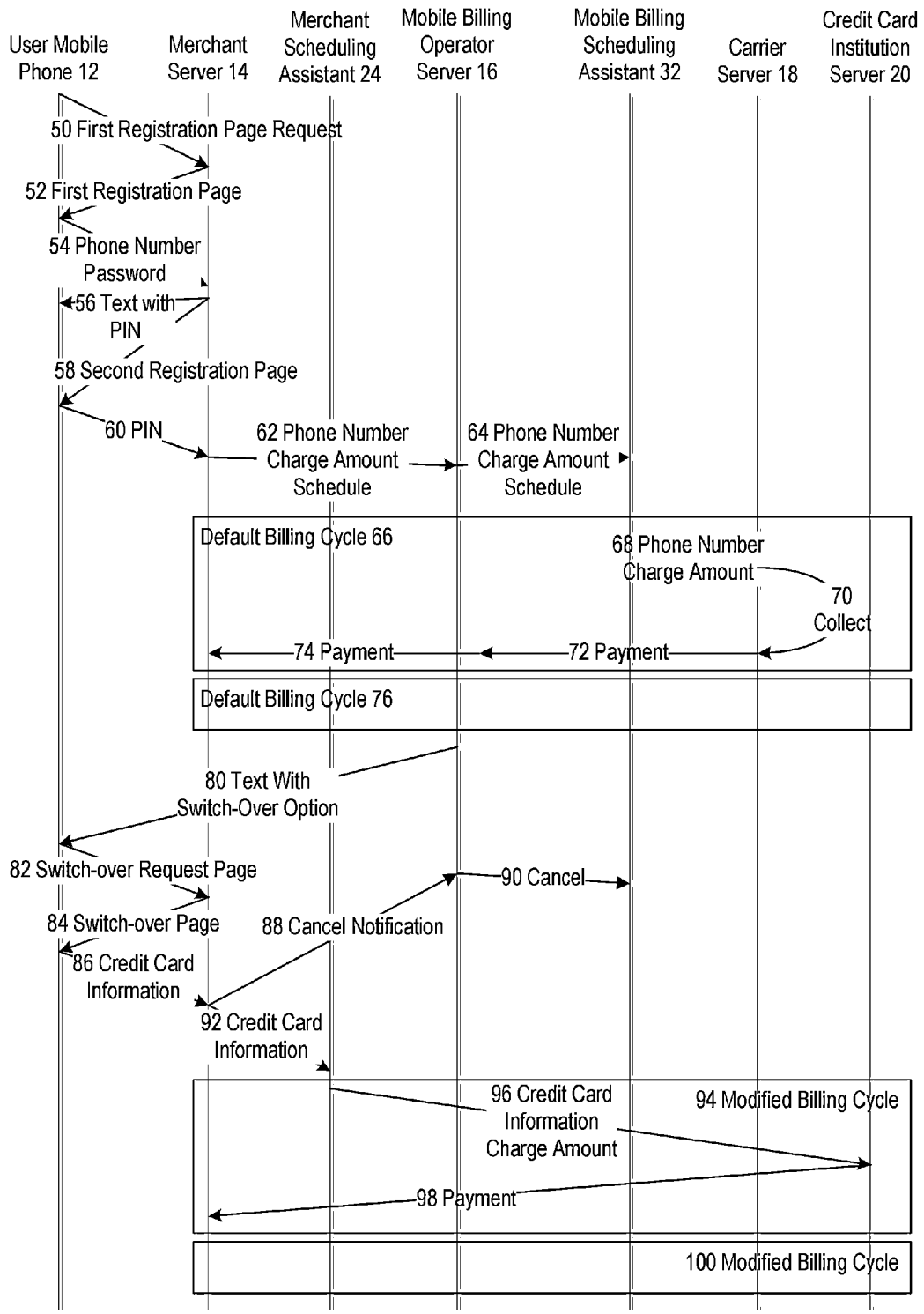
FIG. 2 is an interactive chart illustrating the functioning of the repeat payment computer system.

FIG. 2 illustrates how the repeat payment computer system 10 of FIG. 1 is used to convert a user to a schedule of repeat payments.

At 50, the user at the user mobile phone 12 transmits a first registration page request to the merchant server 14. The user may for example have been shown an advertisement and selecting of the advertisement causes transmission of the first registration page request. The merchant server 14 responds to the first registration page request renewed at 50 and at 52 transmits a first registration page to the user mobile phone 12. The first registration page transmitted at 52 includes fields for the user to enter a phone number of the user mobile phone 12 and a password that is selected by the user. At 54, the user selects a button on the first registration page that causes transmission of the phone number and password to the merchant server 14.

Immediately on receipt of the phone number and password, the merchant server 14 at 56 transmits a text with a PIN to the user mobile phone 12. The merchant server 14 also at 58 immediately transmits a second registration page to the user mobile phone 12. The second registration page has a field for the user to enter the PIN that is received at 56. Once the user has entered the PIN, the user selects a button to transmit the PIN. At 60, the PIN is transmitted by the user mobile phone 12 to the merchant server 14. The PIN is a unique PIN that is generated by the merchant server 14 in response to each separate phone number that is received from separate user mobile phones.

When the merchant server 14 receives the PIN at 60, the merchant server 14 compares the PIN with the PIN that was transmitted at 56. If the PINs compare favorably, then the merchant server 14 at 62 transmits the phone number, a charge amount and a schedule to the mobile billing operator server 16. At 64, the mobile billing operator server 16 registers the phone number, charge amount and schedule with the mobile billing scheduling assistant 32. The charge amount may for example be an amount of $10 and the schedule may be monthly on the first day of the month.

The mobile billing scheduling assistant 32 then executes a number of default billing cycles 66. Each default billing cycle 66 is executed according to the schedule that was registered at the mobile billing scheduling assistant 32 at 64. At 68, the mobile billing scheduling assistant 32 initiates one default billing cycle 66 by transmitting the phone number and the charge amount to the carrier server 18. The carrier server 18 then charges the charge amount to the phone number within the account database 36 in FIG. 1. The charge amount then shows up on the user's monthly statement. The user pays for the monthly statement, and at 70, the carrier server 18 collects the charge amount from the user.

At 72, the carrier server 18 makes a payment to the mobile billing operator server 16. The mobile billing operator server 16 may keep a portion of the payment and at 74 make a payment to the merchant server 14. The payment 74 equals the payment 72 minus the portion taken by the mobile billing operator server 16. Once the merchant server 14 receives the payment 74 a first default billing cycle 66 is completed.

The mobile billing scheduling assistant 32 executes a second default billing cycle 76. The second default billing cycle includes the same steps as the default billing cycle 66. The second default billing cycle 76 is executed according to the schedule. In the present example, the second default billing cycle 76 is executed on the first day of the month following the month that the first default billing cycle 66 was executed.

The schedule registered at 64 includes the number of default billing cycles that are to be executed by the mobile billing scheduling assistant 32. After the number of default billing cycles have been reached the mobile billing operator server 16, at 80, transmits a text with a switch-over option to the user mobile phone 12. The switch-over option is typically a link within the text which, when selected by the user of the user mobile phone 12, opens the browser application on the user mobile phone 12, at 82, and transmits a switch-over page request to the merchant server 14.

The merchant server 14 receives the switch-over page request and immediately responds thereto at 84 to transmit a switch-over page to the user mobile phone 12 for display by the browser application to the user. The switch-over page includes fields for the user to enter credit card information of the user. The user then selects a button which, at 86, transmits the credit card information to the merchant server 14.

At 88, the merchant server 14 responds to the credit card information received at 86 to transmit a cancel notification to the mobile billing operator server 16. At 90, the mobile billing operator server 16 cancels the schedule for the default billing cycles on the mobile billing scheduling assistant 32. The mobile billing scheduling assistant 32 will at this point forward not execute any further ones of the default billing cycles 66 and 76.

At 92, the merchant server 14 also responds to the receipt of the credit card information at 86 to register the credit card information on the merchant scheduling assistant 24. The credit card information includes a sufficient amount of information to allow the merchant scheduling assistant 24 to enter a charge on the credit card institution server 20.

The merchant scheduling assistant 24 now executes a first modified billing cycle 94. The first modified billing cycle 94 is executed on the same schedule as the default billing cycles 66 and 76. At 96, the merchant scheduling assistant 24 transmits the credit card information and the charge amount to the credit card institution server 20. The credit card information 96 includes a credit card number and other information that is used by the credit card institution server 20 to identify a respective account within the account database 38 in FIG. 1. The credit card institution server 20 then charges the respective credit card number within the account database 38. The credit card institution server 20, at 98, makes a payment to the merchant server 14 for an amount that is based on the charge amount plus any percentage charged by the credit card institution server 20.

According to the schedule, a second modified billing cycle 100 is executed by the merchant scheduling assistant 24. The second modified billing cycle 100 may, for example, be executed on the first day of the month following the execution of the first modified billing cycle 94. The second modified billing cycle 100 includes the same steps as the first modified billing cycle 94.

An advantage of the process shown in FIG. 2 is that the user does not have to enter the credit card information for the default billing cycles 66 and 76 to occur. Because the user only enters the phone number and password at 54, fewer barriers are provided for the user to become a regular repeat customer of the merchant server 14. The fees associated with mobile billing according to the default billing cycles 66 and 76 have to be paid by the merchant server 14 and may be too high in the long run. The merchant server 14 can avoid the high fees associated with carrier billing by switching the user to billing according to the credit card information provided at 86. The user is typically switched after the user has already become a regular customer.

Figure 3:
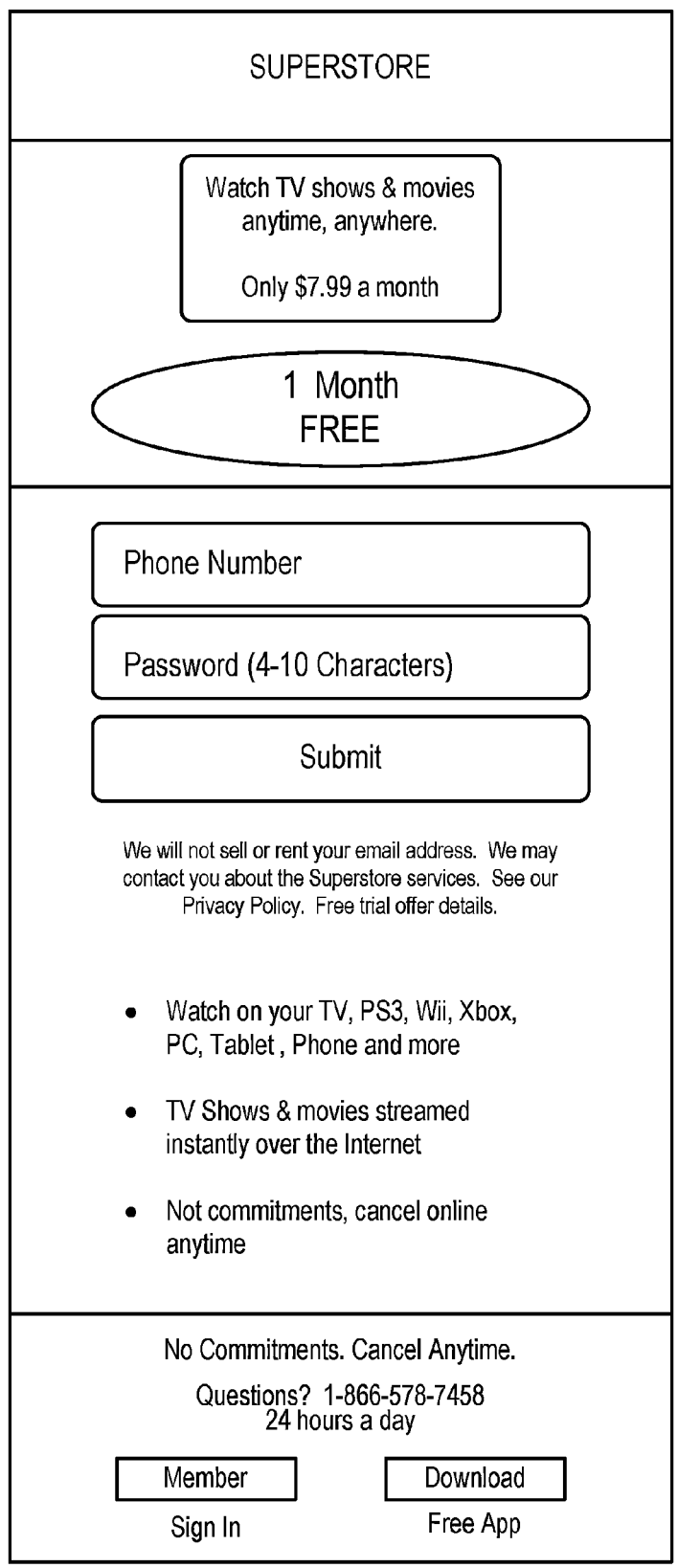
FIG. 3 is a screen shot of a first registration page that is displayed on a user mobile phone.

FIG. 3 is a view of the first registration page that is transmitted at 52 in FIG. 2. Only two field are provided namely for a phone number and for a password. No other fields are provided, and in particular there are no fields provided for any credit card information. The phone number and password are transmitted when a user selects a button "Start Your Free Month."

Figure 4:
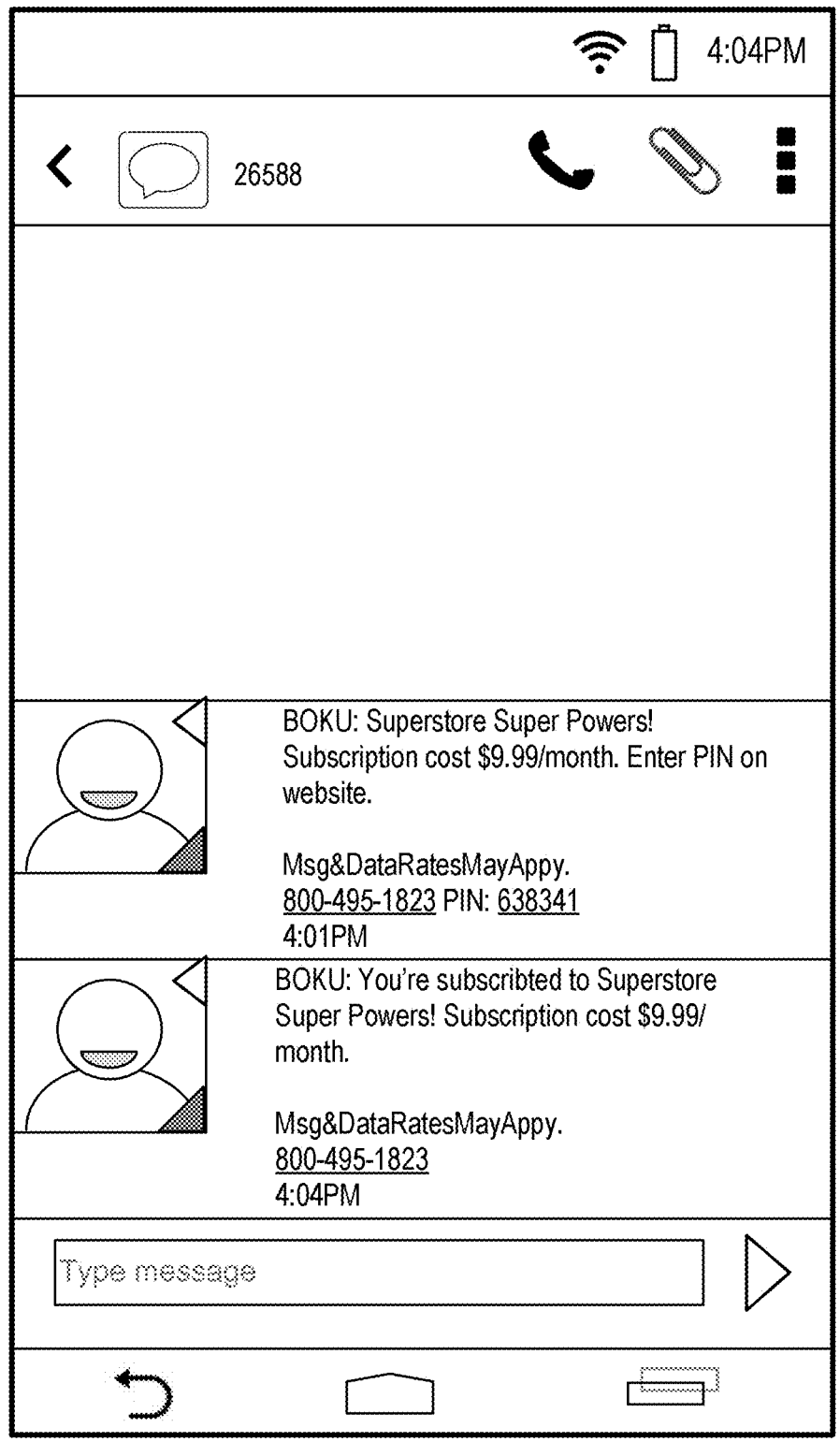
FIG. 4 illustrates text messages that are received by the user mobile phone.

FIG. 4 shows two text messages that are received by the user mobile phone 12. The top text message is the text that is transmitted at 56 in FIG. 2. The bottom text message is a text that is transmitted when the PINs are favorably compared after 60 in FIG. 2.

Figure 5:
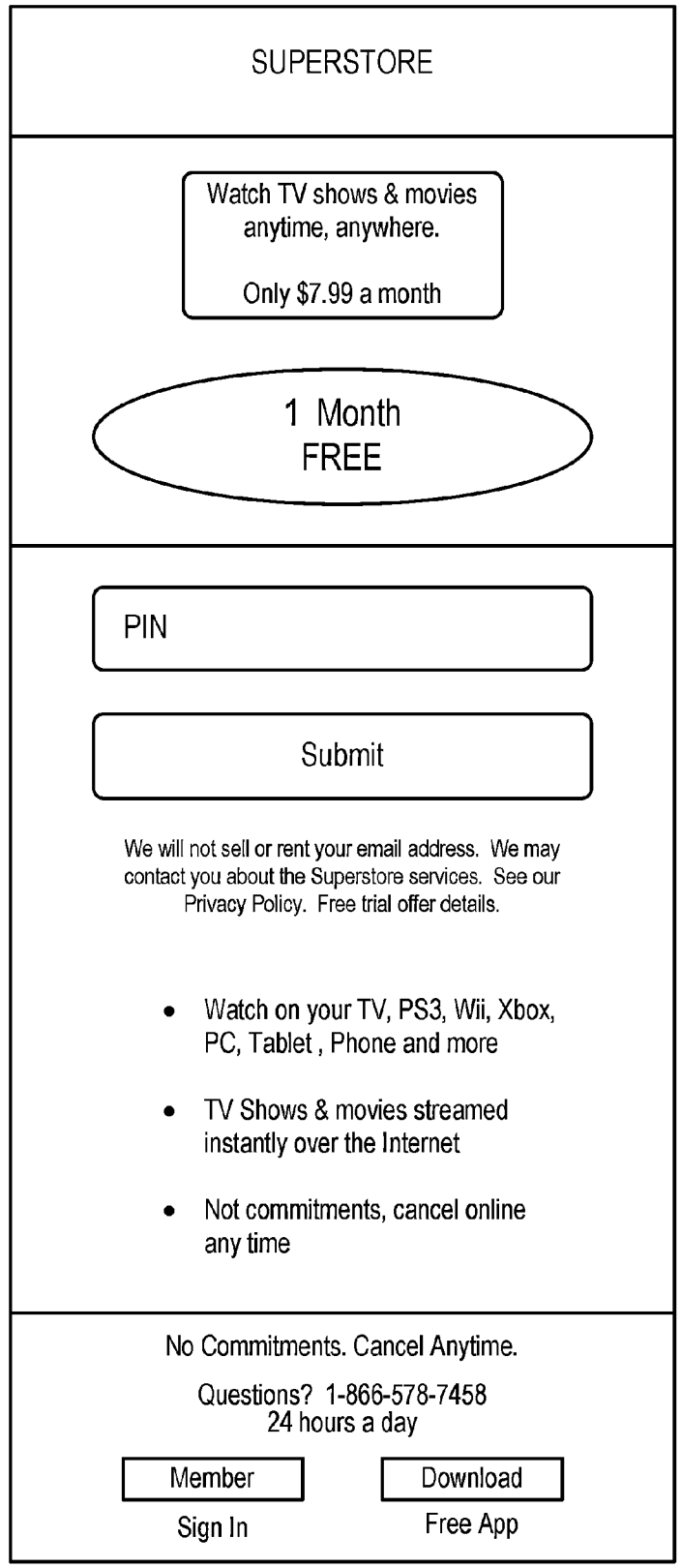
FIG. 5 is a screen shot of a second registration page that is received and displayed by the user mobile phone.

FIG. 5 is a view of the second registration page that is transmitted at 58 in FIG. 2. The only field that is provided is for the PIN. The button "Submit" causes transmission of the PIN at 60 in FIG. 2.

Figure 6:
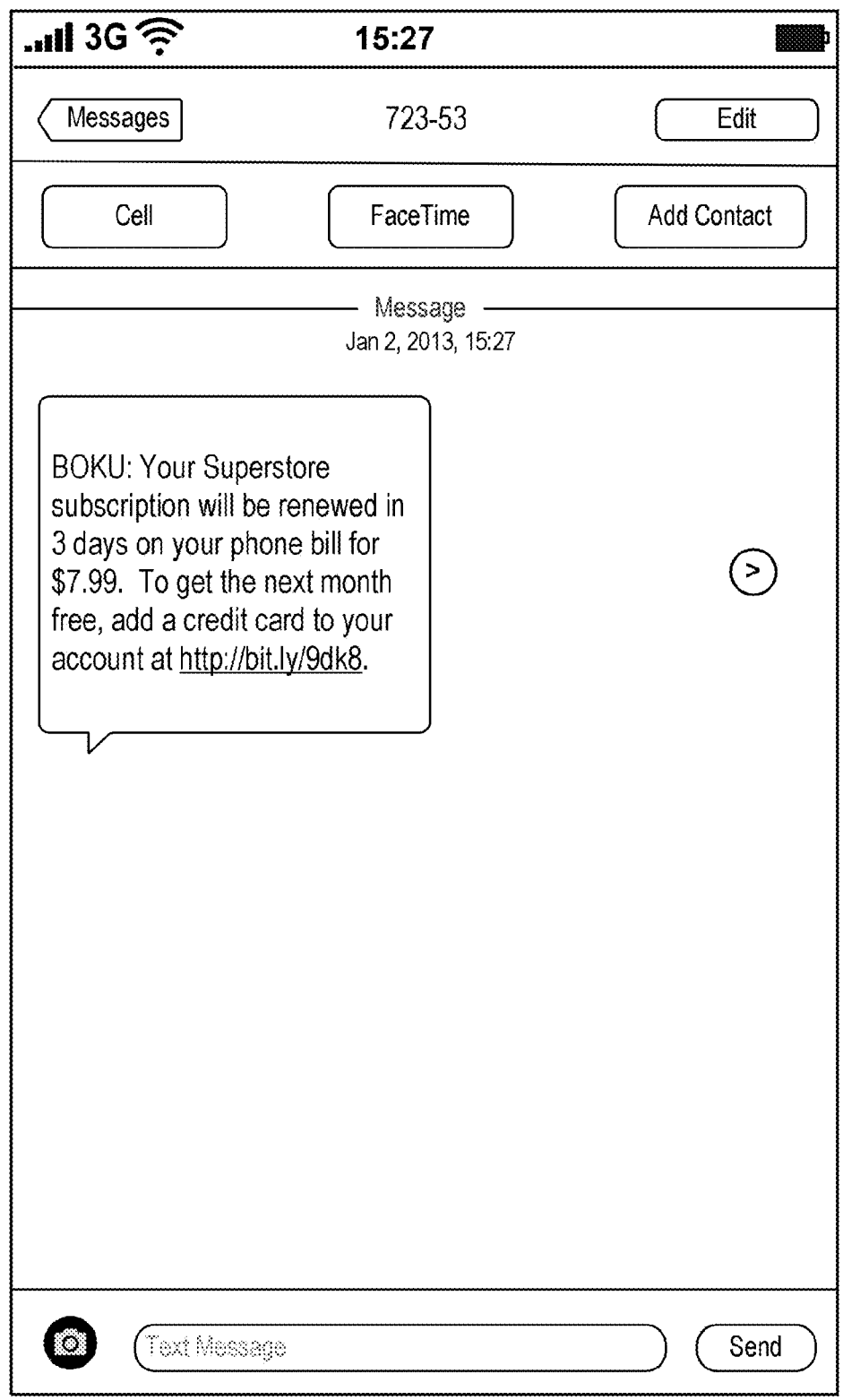
FIG. 6 illustrates a text message that is received by the user mobile phone with a switch-over option.

FIG. 6 is a view of the text that is transmitted at 80 in FIG. 2. The text includes a hyperlink <<http://bit.ly/9dk8>> that serves as a switch-over option. When the hyperlink is selected, the browser application on the user mobile phone 12 opens and transmits the switch-over page request at 82 in FIG. 2.

Figure 7:
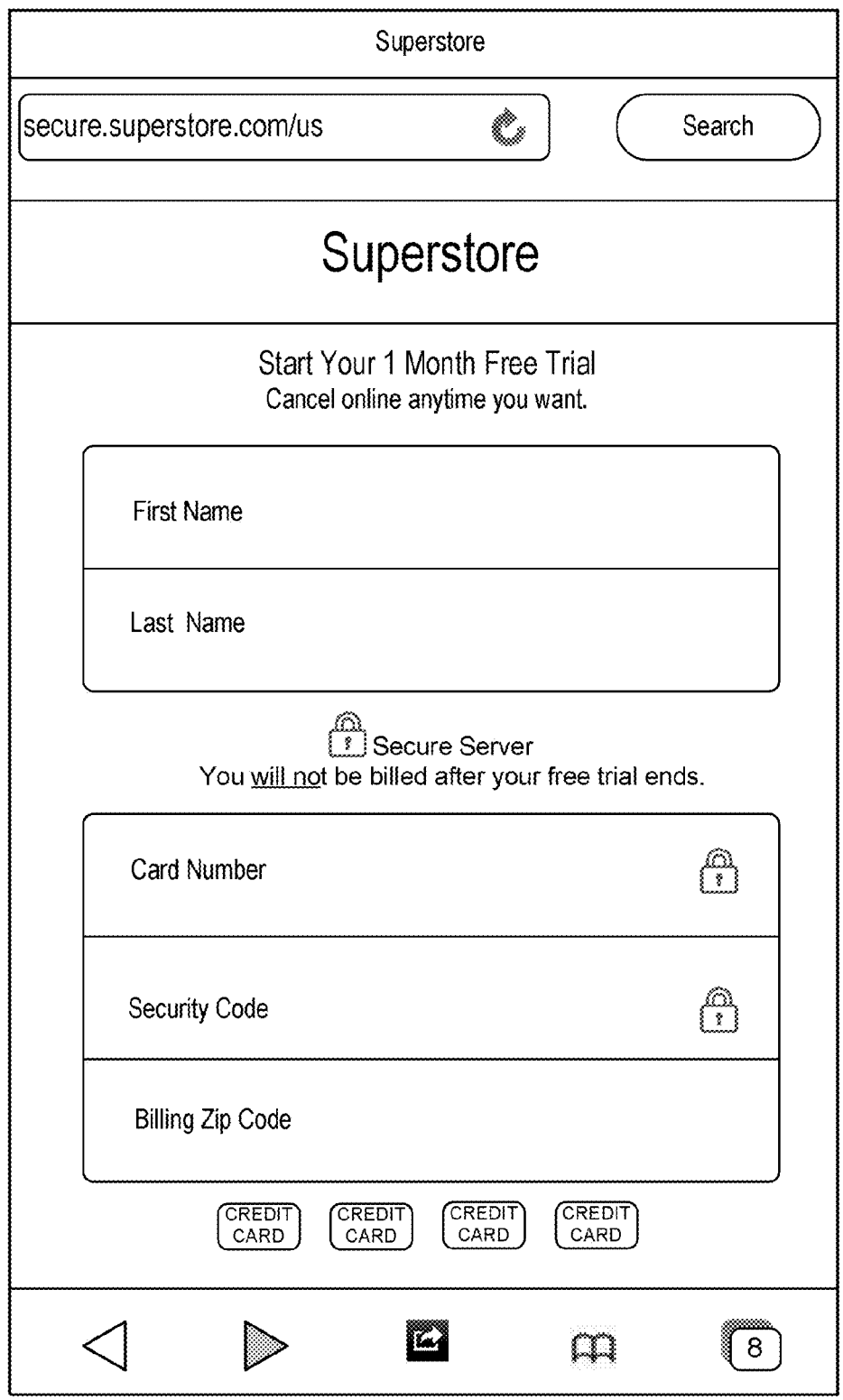
FIG. 7 is a screen shot that is displayed by the user mobile phone when the switch-over option is selected with fields for entering of credit card information.

FIG. 7 illustrates the switch-over page that is transmitted at 84 in FIG. 2. The switch-over page includes fields for the credit card information, including first name, last name, card number, security code and billing zip code.

Figure 8:
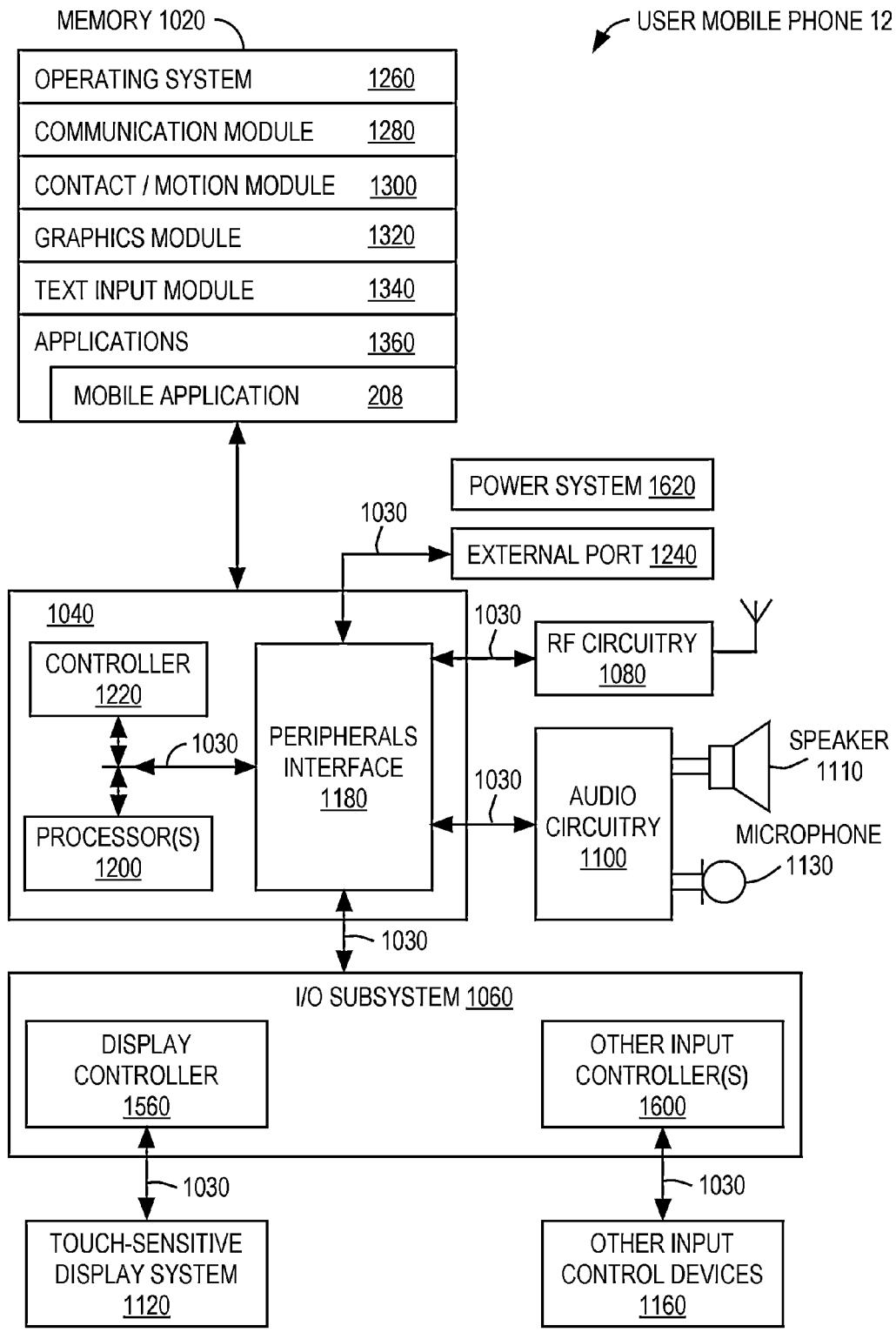
FIG. 8 is a block diagram of the user mobile phone illustrating SmartPhone features thereof.

FIG. 8 is a block diagram illustrating the user mobile device 12, illustrating a touch-sensitive display 1120 or a "touch screen" for convenience. The user mobile device 12 includes a memory 1020 (which may include one or more computer readable storage mediums), a memory controller 1220, one or more processing units (CPU's) 1200, a peripherals interface 1180, RF circuitry 1080, audio circuitry 1100, a speaker 1110, a microphone 1130, an input/output (I/O) subsystem 1060, other input or control devices 1160 and an external port 1240. These components communicate over one or more communication buses or signal lines 1030.

The various components shown in FIG. 8 may be implemented in hardware, software or a combination of hardware and software, including one or more signal processing and/or application specific integrated circuits.

The memory 1020 may include high-speed random access memory and may also include non-volatile memory, such as one or more magnetic disk storage devices, flash memory devices, or other non-volatile solid-state memory devices. Access to the memory 1020 by other components of the user mobile device 12, such as the CPU 1200 and the peripherals interface 1180, is controlled by the memory controller 1220.

The peripherals interface 1180 connects the input and output peripherals of the device to the CPU 1200 and memory 1020. The one or more processors 1200 run or execute various software programs and/or sets of instructions stored in the memory 1020 to perform various functions for the user mobile device 12 and to process data.

The RF (radio frequency) circuitry 1080 receives and sends RF signals, also called electromagnetic signals. The RF circuitry 1080 converts electrical signals to/from electromagnetic signals and communicates with communications networks and other communications devices via the electromagnetic signals. The RF circuitry 1080 includes well-known circuitry for performing these functions, including an antenna system, an RF transceiver, one or more amplifiers, a tuner, one or more oscillators, a digital signal processor, a CODEC chipset, a subscriber identity module (SIM) card, memory, and so forth. The RF circuitry 1080 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies that are known in the art.

The audio circuitry 1100, the speaker 1110, and the microphone 1130 provide an audio interface between a user and the user mobile device 12. The audio circuitry 1100 receives audio data from the peripherals interface 1180, converts the audio data to an electrical signal, and transmits the electrical signal to the speaker 1110. The speaker 1110 converts the electrical signal to human-audible sound waves. The audio circuitry 1100 also receives electrical signals converted by the microphone 1130 from sound waves. The audio circuitry 1100 converts the electrical signal to audio data and transmits the audio data to the peripherals interface 1180 for processing. The audio circuitry 1100 also includes a headset jack serving as an interface between the audio circuitry 1100 and removable audio input/output peripherals, such as output-only headphones or a headset with both output (e.g., a headphone for one or both ears) and input (e.g., a microphone).

The I/O subsystem 1060 connects input/output peripherals on the user mobile device 12, such as the touch screen 1120 and other input/control devices 1160, to the peripherals interface 1180. The I/O subsystem 1060 includes a display controller 1560 and one or more input controllers 1600 for other input or control devices. The one or more input controllers 1600 receive/send electrical signals from/to other input or control devices 1160. The other input/control devices 1160 may include physical buttons (e.g., push buttons, rocker buttons, etc.), dials, slider switches, joysticks, click wheels, and so forth all serving as forming part of an interface. The input controllers 1600 may be connected to any of the following: a keyboard, infrared port, USB port, and a pointer device such as a mouse. The one or more buttons may include an up/down button for volume control of the speaker 1110 and/or the microphone 1130. The one or more buttons may include a push button. A quick press of the push button may disengage a lock of the touch screen 1120 or begin a process that uses gestures on the touch screen to unlock the device. A longer press of the push button may turn power to the user mobile phone 12 on or off. The touch screen 1120 is used to implement virtual or soft buttons and one or more soft keyboards.

The touch-sensitive touch screen 1120 provides an input interface and an output interface between the device and a user. The display controller 1560 receives and/or sends electrical signals from/to the touch screen 1120. The touch screen 1120 displays visual output to the user. The visual output may include graphics, text, icons, video, and any combination thereof (collectively termed "graphics"). In some embodiments, some or all of the visual output may correspond to user-interface objects, further details of which are described below.

A touch screen 1120 has a touch-sensitive surface, sensor or set of sensors that accepts input from the user based on haptic and/or tactile contact. The touch screen 1120 and the display controller 1560 (along with any associated modules and/or sets of instructions in memory 1020) detect contact (and any movement or breaking of the contact) on the touch screen 1120 and converts the detected contact into interaction with user-interface objects (e.g., one or more soft keys, icons, web pages or images) that are displayed on the touch screen. In an exemplary embodiment, a point of contact between a touch screen 1120 and the user corresponds to a finger of the user.

The touch screen 1120 may use LCD (liquid crystal display) technology, or LPD (light emitting polymer display) technology, although other display technologies may be used in other embodiments. The touch screen 1120 and the display controller 1560 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 1120.

The user may make contact with the touch screen 1120 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

The user mobile phone 12 also includes a power system 1620 for powering the various components. The power system 1620 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The software components stored in memory 1020 include an operating system 1260, a communication module (or set of instructions) 1280, a contact/motion module (or set of instructions) 1300, a graphics module (or set of instructions) 1320, a text input module (or set of instructions) 1340, and applications (or set of instructions) 1360.

The operating system 1260 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 1280 facilitates communication with other devices over one or more external ports 1240 and also includes various software components for handling data received by the RF circuitry 1080 and/or the external port 1240. The external port 1240 (e.g., Universal Serial Bus (USB), FIREWIRE, etc.) is adapted for coupling directly to other devices or indirectly over a network (e.g., the Internet, wireless LAN, etc.).

The contact/motion module 1300 may detect contact with the touch screen 1120 (in conjunction with the display controller 1560) and other touch sensitive devices (e.g., a touchpad or physical click wheel). The contact/motion module 1300 includes various software components for performing various operations related to detection of contact, such as determining if contact has occurred, determining if there is movement of the contact and tracking the movement across the touch screen 1120, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts).

The contact/motion module 1300 and the display controller 1560 also detects contact on a touchpad.

The graphics module 1320 includes various known software components for rendering and displaying graphics on the touch screen 1120, including components for changing the intensity of graphics that are displayed. As used herein, the term "graphics" includes any object that can be displayed to a user, including text, web pages, icons (such as user-interface objects including soft keys), digital images, videos, animations and the like.

The text input module 1340, which may be a component of graphics module 1320, provides soft keyboards for entering text in various applications (e.g., contacts, e-mail, IM, blogging, browser, and any other application that needs text input). The applications 1360 may include the mobile application 208.

Figure 9:
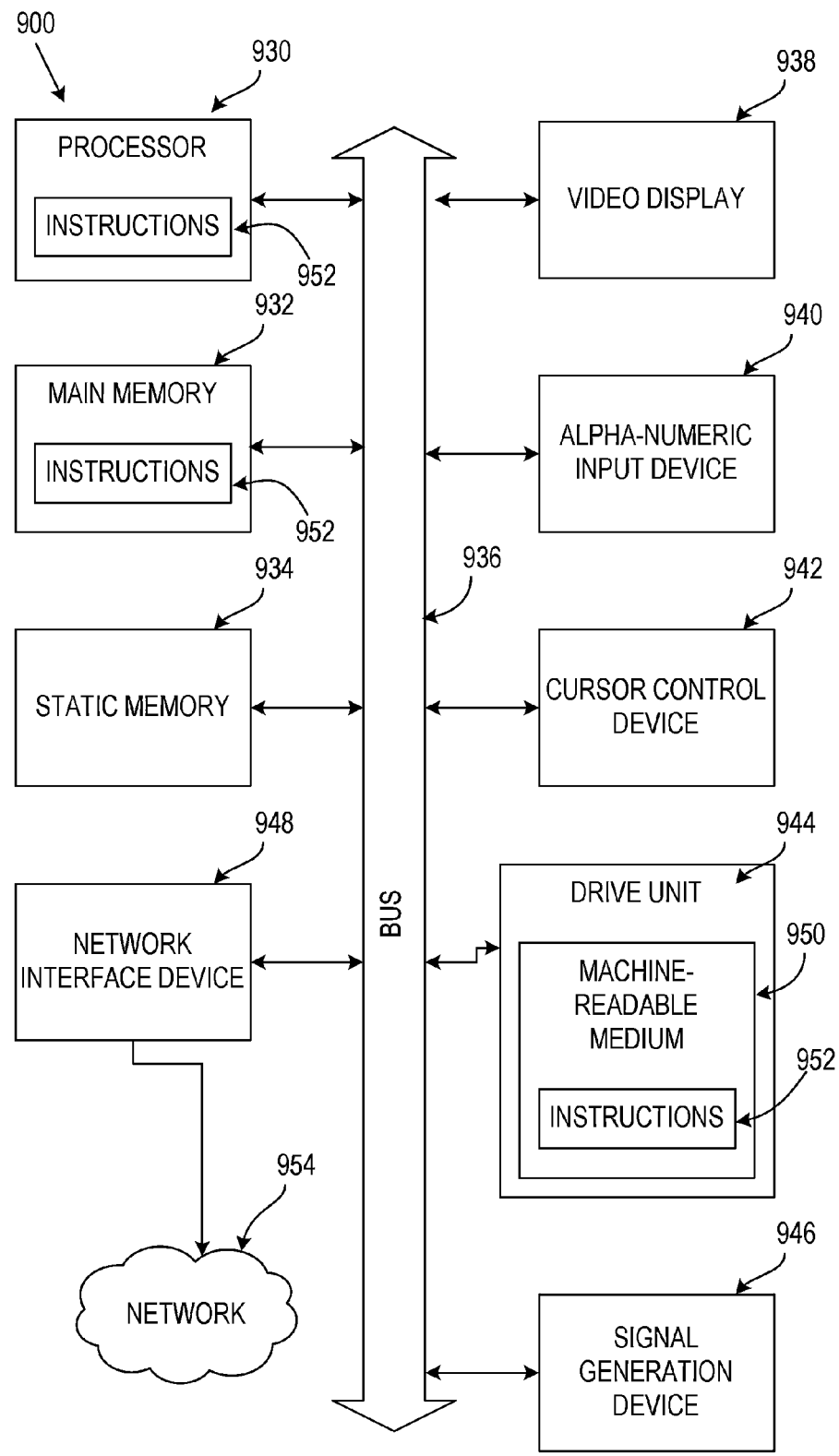
FIG. 9 is a block diagram of a machine in the form of a computer system forming part of the repeat payment computer system.

FIG. 9 shows a diagrammatic representation of a machine in the exemplary form of a computer system 900 within which a set of instructions, for causing the machine to perform any one or more of the methodologies discussed herein, may be executed. In alternative embodiments, the machine operates as a standalone device or may be connected (e.g., networked) to other machines. In a network deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 900 includes a processor 930 (e.g., a central processing unit (CPU), a graphics processing unit (GPU), or both), a main memory 932 (e.g., read-only memory (ROM), flash memory, dynamic random access memory (DRAM) such as synchronous DRAM (SDRAM) or Rambus DRAM (RDRAM), etc.), and a static memory 934 (e.g., flash memory, static random access memory (SRAM, etc.), which communicate with each other via a bus 936.

The computer system 900 may further include a video display 938 (e.g., a liquid crystal display (LCD) or a cathode ray tube (CRT)). The computer system 900 also includes an alpha-numeric input device 940 (e.g., a keyboard), a cursor control device 942 (e.g., a mouse), a disk drive unit 944, a signal generation device 946 (e.g., a speaker), and a network interface device 948.

The disk drive unit 944 includes a machine-readable medium 950 on which is stored one or more sets of instructions 952 (e.g., software) embodying any one or more of the methodologies or functions described herein. The software may also reside, completely or at least partially, within the main memory 932 and/or within the processor 930 during execution thereof by the computer system 900, the memory 932 and the processor 930 also constituting machine readable media. The software may further be transmitted or received over a network 954 via the network interface device 948.

While the instructions 952 are shown in an exemplary embodiment to be on a single medium, the term "machine-readable medium" should be taken to understand a single medium or multiple media (e.g., a centralized or distributed database or data source and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the present invention. The term "machine-readable medium" shall accordingly be taken to include, but not be limited to, solid-state memories and optical and magnetic media.

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

What is claimed:

1. A computer-based method of processing repeat payments, comprising:
   receiving, with a mobile billing operator sever from a merchant server, a phone number of a user mobile phone;
   registering, with the mobile billing operator server, the phone number for repeat payments with a mobile billing scheduling assistant of the mobile billing operator server;
   executing, with the mobile billing scheduling assistant, at least one default payment cycle that includes causing a charge to be entered against the phone number in an account database of a carrier server, receiving a payment from the carrier server at the mobile billing operator server, the mobile billing operator server keeping a portion of the payment received from the carrier server and making a payment from the mobile billing operator server to the merchant server, the payment to the merchant server being for the payment received from the carrier server minus the portion kept by the mobile billing operator server;
   transmitting, with the mobile billing operator server, a text to the user mobile phone at the phone number with a switch-over option after the default billing cycle, the switch-over option including a link that is selectable by a user of the user mobile phone to cause the user mobile phone to open a browser window, request a switch-over page from the merchant server, receive the switch-over page from the merchant server and open the switch-over page that allows the user to enter credit card information for purposes of executing at least one modified billing cycle instead of the default billing cycle wherein the modified billing cycle includes charging a credit card having the credit card details at a credit card institution server other than the carrier server;
   receiving, at the mobile billing operator server, a cancel notification from the merchant server when the merchant server receives the credit card information; and
   cancelling, with the mobile billing operator server, the default payment cycle on the mobile billing scheduling assistant in response to the cancel notification.

2. The method of claim 1, wherein the payment made from the mobile billing operator server is in response to the payment made to the mobile billing operator server.

3. The method of claim 1, wherein if the user fails to select the link, the mobile billing scheduling assistant repeats the default payment schedule.

4. The method of claim 1, further comprising:
   receiving, with the mobile billing operator server, a charge amount and a schedule from the merchant server; and
   registering, with the mobile billing operator server, the charge amount and schedule with the mobile billing scheduling assistant, wherein the default payment is repeatedly executed according to the schedule and the charge includes an amount that is based on the charge amount.

5. A repeat payment computer system, comprising:
   a processor;
   a computer-readable medium connected to the processor; and
   a set of instructions on the computer-readable medium, the set of instructions being executable by the processor including:
      a module receiving a phone number of a user mobile phone from a merchant server;
      a mobile billing scheduling assistant, the phone number being registered for repeat payments with the mobile billing scheduling assistant executing at least one default payment cycle that includes causing a charge to be entered against the phone number in an account database of a carrier server, receiving a payment from the carrier server at the mobile billing operator server, the mobile billing operator server keeping a portion of the payment received from the carrier server and making a payment from the mobile billing operator server to the merchant server, the payment to the merchant server being for the payment received from the carrier server minus the portion kept by the mobile billing operator server; and
      an SMS gateway transmitting a text to the user mobile phone at the phone number with a switch-over option after the default billing cycle, the switch-over option including a link that is selectable by a user of the user mobile phone to cause the user mobile phone to open a browser window, request a switch-over page from the merchant server, receive the switch-over page from the merchant server and open the switch-over page that allows the user to enter credit card information for purposes of executing at least one modified billing cycle instead of the default billing cycle wherein the modified billing cycle includes charging a credit card having the credit card details at a credit card institution server other than the carrier server, the mobile billing scheduling assistant receiving a cancel notification from the merchant server when the merchant server receives the credit card information, and cancelling the default payment cycle on the mobile billing scheduling assistant in response to the cancel notification.

6. The system of claim 5, wherein the payment made from the mobile billing operator server is in response to the payment made to the mobile billing operator server.

7. The system of claim 5, wherein if the user fails to select the link, the mobile billing scheduling assistant repeats the default payment schedule.

8. A non-transitory computer-readable medium having stored thereon a set of instructions that, when executed by a processor of a mobile billing operator server, carries out a method comprising:
   receiving, with a mobile billing operator sever from a merchant server, a phone number of a user mobile phone;
   registering, with the mobile billing operator server, the phone number for repeat payments with a mobile billing scheduling assistant of the mobile billing operator server;
   executing, with the mobile billing scheduling assistant, at least one default payment cycle that includes causing a charge to be entered against the phone number in an account database of a carrier server, receiving a payment from the carrier server at the mobile billing operator server, the mobile billing operator server keeping a portion of the payment received from the carrier server and making a payment from the mobile billing operator server to the merchant server, the payment to the merchant server being for the payment received from the carrier server minus the portion kept by the mobile billing operator server;

transmitting, with the mobile billing operator server, a text to the user mobile phone at the phone number with a switch-over option after the default billing cycle, the switch-over option including a link that is selectable by a user of the user mobile phone to cause the user mobile phone to open a browser window, request a switch-over page from the merchant server, receive the switch-over page from the merchant server and open the switch-over page that allows the user to enter credit card information for purposes of executing at least one modified billing cycle instead of the default billing cycle wherein the modified billing cycle includes charging a credit card having the credit card details at a credit card institution server other than the carrier server;

receiving, at the mobile billing operator server, a cancel notification from the merchant server when the merchant server receives the credit card information; and cancelling, with the mobile billing operator server, the default payment cycle on the mobile billing scheduling assistant in response to the cancel notification.

* * * * *